(12) United States Patent
Rosales et al.

(10) Patent No.: US 9,940,505 B2
(45) Date of Patent: Apr. 10, 2018

(54) METHOD FOR DRIVER FACE DETECTION IN VIDEOS

(71) Applicant: Alcohol Countermeasure Systems (International) Inc., Toronto (CA)

(72) Inventors: Edward Rosales, Toronto (CA); Xiaoming Nan, Toronto (CA); Ling Guan, Toronto (CA); Azhar Quddus, Toronto (CA); Zhou Qun, Toronto (CA)

(73) Assignee: Alcohol Countermeasure Systems (International) Inc., Toronto, Ontario (CA)

( * ) Notice: Subject to any disclaimer, the term of this patent is extended or adjusted under 35 U.S.C. 154(b) by 104 days.

(21) Appl. No.: 14/921,793

(22) Filed: Oct. 23, 2015

(65) Prior Publication Data

US 2016/0117546 A1 Apr. 28, 2016

Related U.S. Application Data

(60) Provisional application No. 62/067,491, filed on Oct. 23, 2014.

(51) Int. Cl.
*G06K 9/00* (2006.01)
*B60R 11/04* (2006.01)
*G06T 7/262* (2017.01)

(52) U.S. Cl.
CPC .......... *G06K 9/00255* (2013.01); *B60R 11/04* (2013.01); *G06K 9/00288* (2013.01); *G06T 7/262* (2017.01); *G06T 2207/20064* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2007/0153091 A1* | 7/2007 | Watlington | H04N 7/15 348/208.14 |
| 2008/0260212 A1* | 10/2008 | Moskal | A61B 5/1079 382/118 |

\* cited by examiner

*Primary Examiner* — Weiwen Yang
(74) *Attorney, Agent, or Firm* — Head, Johnson, Kachigian & Wilkinson, PC

(57) ABSTRACT

A method for use with a stream of images defining a video. The method includes the steps of periodically conducting a face finding operation on an image in the stream. In respect to the last image in the stream preceding the image in which one or more faces was found, a tracker based upon wavelet decomposition is used to find a face for each face found in the last image for which no counterpart was found in the image.

6 Claims, 5 Drawing Sheets

METHOD FOR DRIVER FACE DETECTION IN VIDEOS

CROSS-REFERENCE TO RELATED APPLICATIONS

This application claims priority to U.S. Provisional Patent Application Ser. No. 62/067,491 filed Oct. 23, 2014, which is herein incorporated by reference.

BACKGROUND OF THE INVENTION

1. Field of the Invention

The present invention is directed to a method for use with a stream of images defining a video wherein the method includes periodically conducting a face finding operation on an image in the stream of videos and in respect of the last image in the stream preceding the image in which one or more faces are found, using a tracker based upon wavelet decomposition to find a face for each face found in the last image for which no counterpart was found.

2. Prior Art

Face detection plays a crucial role in a wide range of applications such as human computer interface, facial biometrics, video surveillance, gaming, video analytics and face image database management. Often, these real world applications rely heavily on the face detection as the first stage of the overall system. Typically face detection algorithms are built with one or more assumptions, such as, frontal face, illumination conditions and no occlusions. Consequently, these algorithms become quite unreliable when dealing with real world difficult scenarios. One such application area is "fitness to drive" where, sudden changes in the driver's face pose, illumination, reflections as well as occlusions cannot be avoided.

Most of the existing face detection algorithms address only few of these challenging scenarios. Consequently, many databases have been made public where one of the problems is the reoccurring theme in their respective database; the YALE database is the most common database used for variations in illumination. Variations in illumination proves to be an excessive challenge for researchers as there are infinite possibilities of lighting variations that can occur in real world scenarios. For example, lighting variations can range from variable light source location to multiple light sources. The HONDA database strictly focuses on different face orientations. Face orientation continues to be a challenge as face detection for a partially occluded face often becomes difficult as common classifiers typically rely on specific key features on the face.

The proposed algorithm attempts to tackle all three of the problems mentioned above simultaneously by applying preprocessing to the target frame to normalize the amount of illumination variation, applying a cascading set of classifiers to increase the overall range of face orientation the algorithm is confidently able to detect and applying an adaptive Discrete Wavelet Transform (DWT) based tracker to track the location of the face if the cascading classifiers fail.

SUMMARY OF THE INVENTION

The exemplary algorithm in this paper focuses on face detection in videos in uncontrolled environments by alleviating these variations to achieve a higher and more accurate detection rate. The algorithm, shown in FIGS. 1 and 2, uses a novel approach to face detection by implementing the use of soft and hard edges in the detection of the face in the scene and differs from other facial detection algorithm by its dependency on the spatial and intensity information achieved from the local DWT transform that is performed on the image. Thus, rather than relying strictly on the face detector module, the tracker module finds the best matching face using edge correlation among the multiple DWT levels.

The algorithm applies a simple, yet effective preprocessing step to assist the face detection classifiers in detecting facial areas. The preprocessing step applies gamma correction normalization to the input image to normalize the illumination present in the frame.

DETAILED DESCRIPTION OF THE PREFERRED EMBODIMENTS

Figure 1:
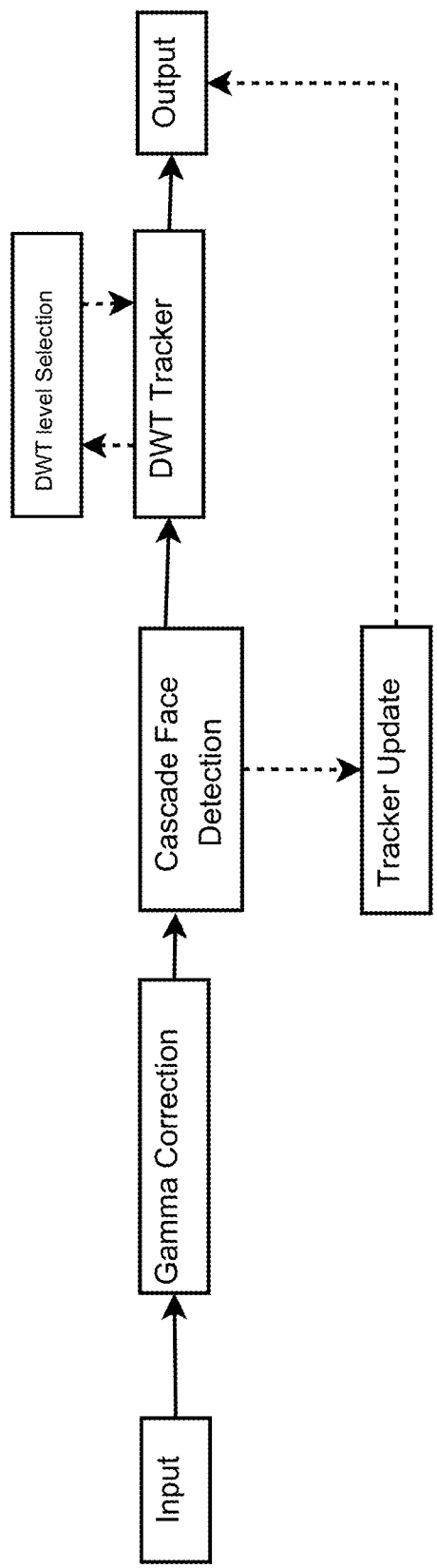
FIG. 1: Proposed face detection pipeline
Figure 2:
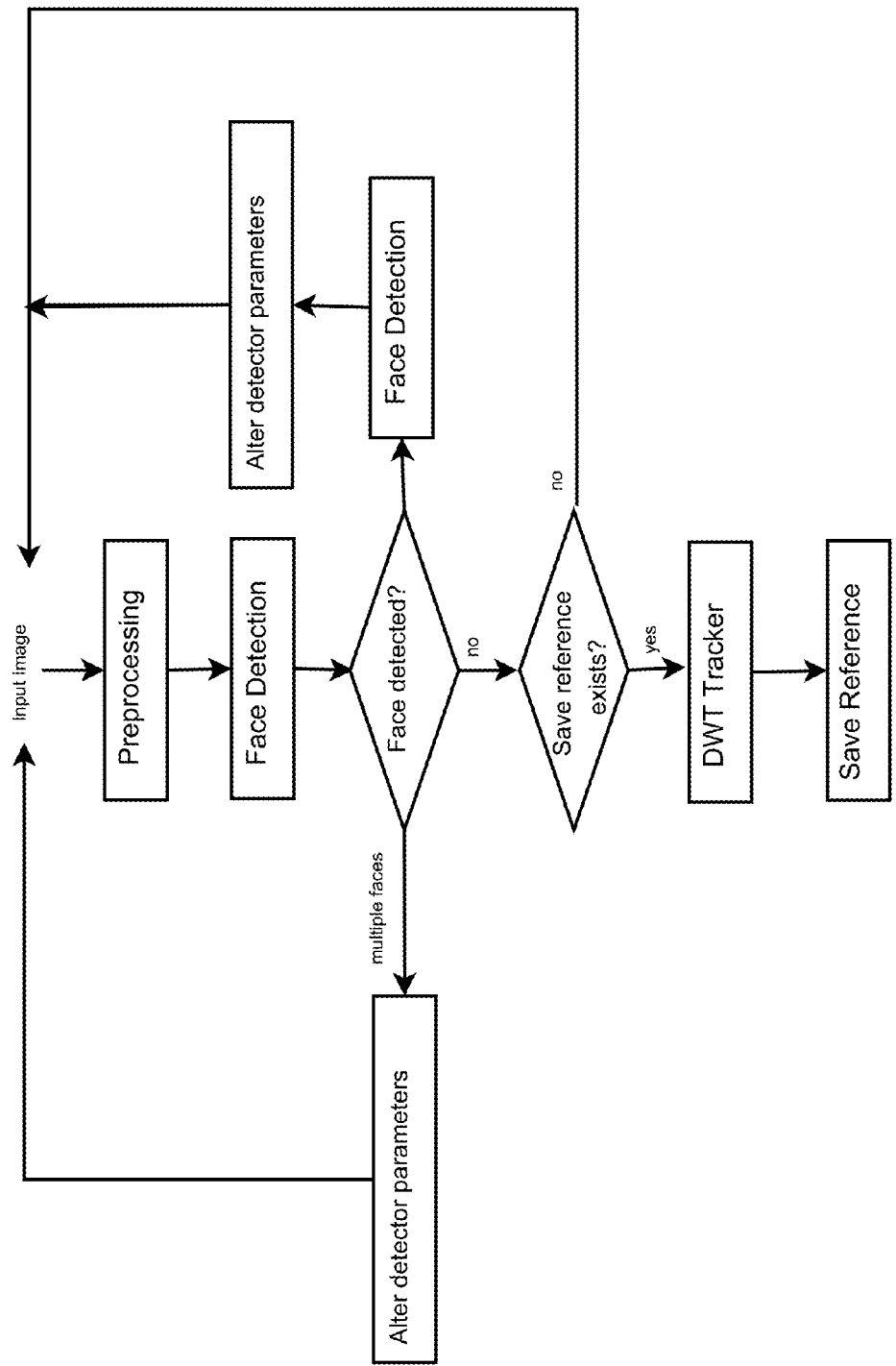
FIG. 2: Logic for Tracker Update

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Cascade Face Detection

The Cascading face detection module allows for a more robust range of face detection with different variations in pose. Each used classifier is more fine tuned towards a specific deviation of the face. Such examples of this include frontal face classifiers such as the Haar_frontal_face_alt_tree classifier defined in OpenCV and prolific face classifiers such as the Haar_profile face. These distinctions provide the proposed algorithm with a much higher reliability in uncontrolled environments. Moreover, the parameters in the face detectors are adaptively adjusted as the video progresses, thus adaptively adjusting the constraints of the face detectors. For example, if the detection misses faces in the beginning, the detector result cannot provide reliable references for the following face tracker. Thus, the constraints are automatically adjusted to provide more leniency when detecting faces. Conversely, if the algorithm detects too many false positives, the detectors are adjusted to be more strict in deciding on faces. This increases the overall robustness of the algorithm to find and classify the position of an optimal face in the scene. Algorithm 2 provides the pseudo code for the cascading face detection module. As seen, the number of face classifiers in the algorithm is preset to 2, though this can be altered depending on the chosen classifiers. Additionally, the module sends the image to the update tracker method to save the detected face region as a reference image for later use.

Tracker Update

The tracker update modules purpose is to provide the tracker algorithm with the necessary information needed to correctly track the face. The module saves the detected face from the face detection module within a vector of size equal to the amount of classifiers used in the module, where the position of the saved face is determined by which classifier detected the face. Additionally, due to the possibility of the tracked face to move farther or closer to the camera, the face size is normalized among all previously detected faces. This allows the tracker to find the most optimal face location with rarely compromising the loss of face regions due to the window size being too small.

---

Algorithm 1: Cascading face detection algorithm

---

```
input image from preprocessing step ;
initialize faceCascade=0 ;
while faceCascade < 2 do
 |  read classifier @ faceCascade;
 |  try face detection w. classifier;
 |  if face found then
 |  |  save face;
 |  |  update tracker ;
 |  |  break;
 |  else
 |  |  faceCascade++;
 |  end
end
if no face found then
 |  go to tracker
end
```

---

Algorithm 2: Tracker Update

---

```
update reference face @ faceCascade ;
save face in ROI ;
find average window size ;
```

---

Refinement Module

As previously stated, the parameters used in the cascading face detectors must be adaptively refined to achieve the optimal amount of faces, though in order to do this a refinement module must be added. The refinement module simply alters the system parameters to achieve a minimum number of faces. Of course, with this method it is possible that the Viola-Jones algorithm may detect a false positive. Therefore, to ensure that the system parameters are altered to only accept a minimum amount of true positive faces, a comparison algorithm is also used, where the known face and the target face are compared and must be under a certain threshold for it to be considered as a true face.

DWT Tracker

The DWT tracker acts as a secondary face detection module for the frames where the primary face detection module fails. As mentioned in Section 4.2, the last known face for each face classifier is saved. These saved reference images are used to find the optimal face location in the target frame. Unlike conventional tracker methods such as mean shift and cam shift, the exemplary algorithm uses a confidence check on the DWT levels to find the most optimal match in the frame ROI.

In this work, the tracker utilizes multiscale wavelet decompositions. This wavelet transform is efficiently computed at dyadic scales using separable low-pass and high-pass filters, providing characterization of signal singularities, namely, Lipschitz exponents. In two dimensions, this wavelet decomposition characterizes to multiscale edge detection and can be formalized through a wavelet transform defined with respect to two dyadic wavelets at scale j as $$\psi^1_{2^j}(x,y) = \frac{1}{2^{2j}}\psi^1\left(\frac{x}{2^j}, \frac{y}{2^j}\right), \text{ and } \psi^2_{2^j}(x,y) = \frac{1}{2^{2j}}\psi^2\left(\frac{x}{2^j}, \frac{y}{2^j}\right).$$

The wavelet transform of an image $f(x,y) \in L^2(R^2)$ at scale j has two components, namely, $W_{2^j}^1 f(x,y) = f * \psi_{2^j}^1(x,y)$ and $W_{2^j}^2 f(x,y) = f * \psi_{2^j}^2(x,y)$. The 2-D dyadic wavelet transform of $f(x,y)$ is the set of functions $Wf = (W_{2^j}^1 f(x,y), W_{2^j}^2 f(x,y))_{j \in Z}$.

Here $\psi^1(x,y)$ and $\psi^2(x,y)$ are defined as, $$\psi^1(x,y) = \frac{\partial \theta(x,y)}{\partial x}, \psi^2(x,y) = \frac{\partial \theta(x,y)}{\partial y} \quad (1)$$

where $\theta(x,y)$ is a 2D smoothing function whose integral over x and y is equal to 1 and converges to 0; and hence wavelet transform can be written as, $$\begin{pmatrix} W_{2^j}^1 f(x,y) \\ W_{2^j}^2 f(x,y) \end{pmatrix} = 2^j \begin{pmatrix} \frac{\partial}{\partial x}(f * \theta_{2^j})(x,y) \\ \frac{\partial}{\partial y}(f * \theta_{2^j})(x,y) \end{pmatrix} \quad (2)$$

$$= 2^j \vec{\nabla}(f * \theta_{2^j})(x,y)$$

Here the two components of the wavelet transforms are proportional to the two components of the gradient vector $\vec{\nabla}(f*\theta_{2^j})(x,y)$. The magnitude of this wavelet decomposition (WTM) is given as, $$M_{2^j}f(x,y) = \sqrt{|W_{2^j}^1 f(x,y)|^2 + |W_{2^j}^2 f(x,y)|^2} \quad (3)$$

It has been proved that if $\psi_{2^j}^1(x,y)$ and $\psi_{2^j}^2(x,y)$ are quadratic spline functions (derivative of a cubic spline function) then the wavelet transform can be implemented efficiently using simple FIR filters. This wavelet is found to be insensitive to inhomogeneity in magnetic resonance image retrieval. It is worth mentioning that this wavelet algorithm is implemented as à trous algorithm where multiresolution decompositions are computed by scaling the filters themselves.

In order to compute multiscale wavelet based features, the detected face image is resized to 100×100 pixels. Wavelet transform magnitude $M_{2^j}f(x,y)$ of this image is computed for 3 levels. These multiscale decompositions are divided into non-overlapping block of 20×20 pixels each, Histograms with 64 bins from each block and in each level is concatenated to form the final feature vector γ.

The optimal face location is determined by systematically scanning through a predefined radius, relative to the position of the last detected face, comparing the feature vectors of the reference image with that of the target image. The matching between the reference image and the target frame is done using the minimum of the $L_1$ or Manhattan distance, as shown in Equation 4, where (i,j) are the image coordinates within the image window W, and (m,n) is the center of the face image. Let $\gamma_1$ be the feature vector of the reference image, and $\gamma_2$ be the feature vector of the target image. The search window used for finding the optimal location of the face originates from the position of the top left corner of the last known reference frame, and the predefined search radius defines the shift of this position. The best match within the search area is considered as optimal location.

$$\Delta(m, n) = \frac{1}{2} \sum_{(i,j) \in W} |Y_1(i, j) - Y_2(m + i, n + j)| \quad (4)$$

Figure 3:
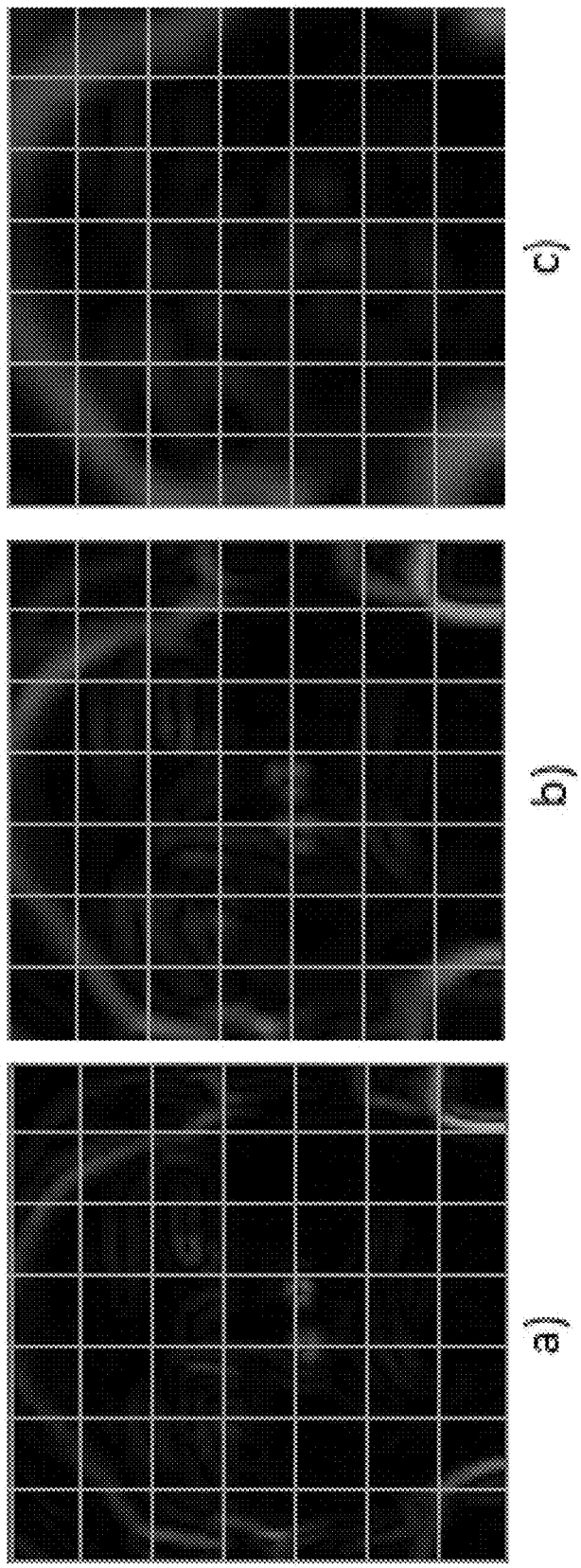
FIG. 3: Examples block separation for local features in each DWT level

Algorithm 3 provides the algorithm of the DWT tracker, where x is a predefined radius variable, and the correlation is determined by the cross-correlation of the reference face local histograms and the target image histograms of each DWT level. Local histograms are determined by iterating through the region of interest, acquiring the histogram for a corresponding sub window at each shifted, non-overlapping location. Local histogram comparisons not only provide a good comparisons of intensity values, but due to the small size of each sub window, it also provides the tracker with low level spatial information. FIG. 3 shows the non-overlapping subwindows for each level in the DWT. As seen, some edges are more dominant in lower levels while other edges are more dominant in the higher level DWTs. These properties, with the combination of the local histograms for spatial information provides multiple levels of comparisons for the tracker.

---
Algorithm 3: DWT Tracker
---
```
for radius +/- x pixels do
|   for each level (j) of the M_2j f (x, y) do
|   |   compute γ_1 ;
|   |   compute γ_2 ;
|   |   compare histograms (Δ(m, n) ) ;
|   |   if distance < min distance then
|   |   |   update new ROI;
|   |   end
|   end
end
extract frame at ROI;
```

Previous experiments showed promising results when one level of the DWT was taken, though results achieved from the multi-level DWT tracker performed better. Due to the amount of information present in the multi-level DWT, the accuracy of the tracker is fine tuned with DWT from the lower levels of the DWT whereas the information from DWT is much more reliable in the higher levels. This resulted in increase in robustness in our tracking algorithm.

Results

Figure 4:
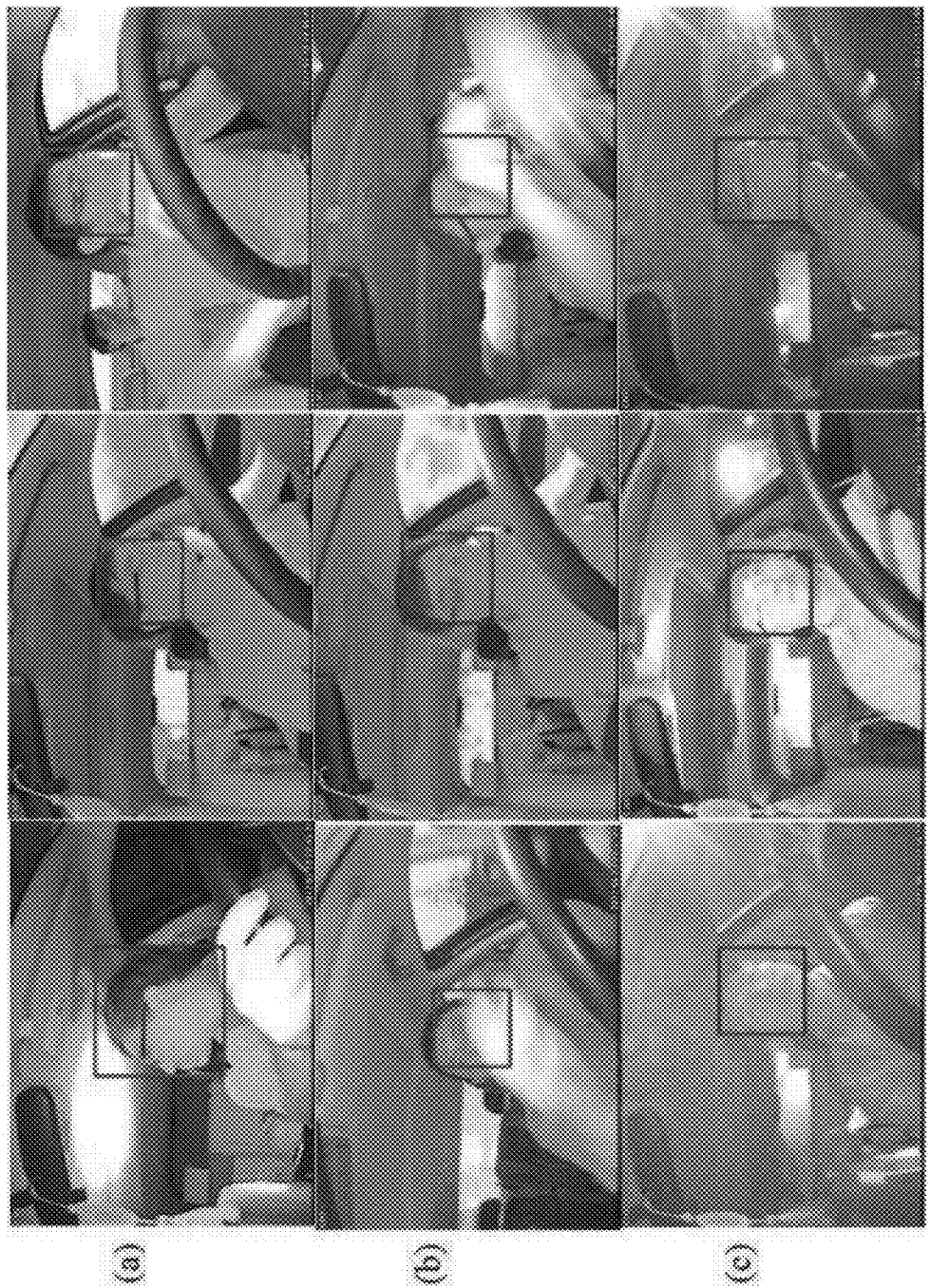
FIG. 4: Examples of tracked faces in internally developed database. a) tracked faces with high pose variation, b) tracked faces with various levels of occlusion, and c) tracked faces with different illuminations
Figure 5:
FIG. 5: Examples of tracked faces in HONDA Database

The exemplary algorithm was tested on a 3.10 GHz Intel i5 processor with 4 GB of RAM. Two classifiers that were chosen were based off of the OpenCV classifiers, Haar_frontalface_alt_tree, and Haar_profileface. This combination of classifiers provided the best results when the search radius was defined as 10 pixels in each direction. As seen in FIGS. 4 and 5, the tracking module of the algorithm is capable of detecting a user at several extreme rotations, occlusions, and lighting variations. Tables 1 and 2 are organized as follows; Method 1 represents the baseline face detection algorithm only, where the Haar_frontalface_alt_tree classifier. Method 2 describes method 1 with the preprocessing module, method 3 expands on method 2 by using cascading face detectors, and method 4 introduces the multi-level DWT tracker to method 3. Table 1 demonstrates the progression of the algorithm as well as the significant improvement of the proposed algorithm over the baseline. Obviously, the addition of the DWT tracker improves the accuracy of the algorithm by 50% and 20%, for the HONDA database and internally developed database, respectively. The proposed algorithm achieves a computational time that is specifically dependent on the pixel radius chosen. In this test case, the computational time that was achieved was an average 0.149 seconds per frame.

Conclusion

In conclusion, the exemplary algorithm is capable of achieving a face detection rate acceptable for real world applications such as driver detection and security systems. Although the implementation of the tracker increases the computational

TABLE 1

Algorithm accuracy (True Detection Rate)

| Algorithm | HONDA accuracy (%) | Internal Database (%) |
|---|---|---|
| method 1 | 30.18 | 67.8 |
| method 2 | 35.95 | 68.3 |
| method 3 | 45.69 | 74.9 |
| method 4 | 91.58 | 93.8 |

TABLE 2

Algorithm Computational Time

| Algorithm | Internal Database (s) | Honda Database (s) |
|---|---|---|
| method 1 | 0.045 | 0.061 |
| method 2 | 0.045 | 0.061 |
| method 3 | 0.049 | 0.062 |
| method 4 | 0.147 | 0.149 | time of the algorithm, the increase is not significant as compared to the large improvement in detection rate the tracker offers to the algorithm.

Whereas but a single embodiment is described in detail, it will be evident that variations are possible.

For example, whereas the images associated with the faces found by the tracker and face finder are herein contemplated to be fed to an identification tool, to enable a specific person to be identified with relative certainty, the method could be used for other purposes.

As well, whereas the tracker is herein contemplated to use the location of the last face found by the face finding functionality as the starting point for the tracker, this is not strictly necessary. The tracker will use a relatively high confidence target area as the starting point. The location of a face found by a face finder in the immediately preceding image in the stream will be understood to be a target location for finding a face in respect of which persons of ordinary skill will have confidence. However, if the face finder functionality can find no face for a prolonged period of time, the likelihood of finding a face in the exact location last found will be understood to decrease. In cases such as this, the tracker may be configured to use the last face found by the tracker location as a starting point, particularly if a strong pattern can be identified in terms of the location of the last face found by the face finder and the locations of the faces found by the tracker in the intervening images.

Accordingly, the invention should be understood as limited only by the accompanying claims, purposively construed.

What is claimed is:

1. A method for use with a stream of images defining a video, the method comprising the steps of:
   periodically conducting a face finding operation such that face finding operations are carried out on more than one images in the stream;
   comparing the results of the face finding operations to identify occurrences wherein a face found by the face finding operation in an image is not found by the face finding operation in a following image;
   in the following image, using a tracker based upon wavelet decomposition to attempt to find the face, the tracker using the last image in the stream in which the face was found by the face finding operation.

2. A method according to claim 1, wherein the tracker uses the location of the face found in the previous image to find the face in the current image.

3. A method according to claim 1, wherein the face finding operation is carried out on each image in the stream.

4. A method according to claim 1, wherein a face detection operation is carried out in respect of each face found.

5. A method according to claim 2 wherein a face detection operation is carried out in respect of each face found.

6. A method according to claim 3 wherein a face detection operation is carried out in respect of each face found.

* * * * *